United States Patent [19]

Henton

[11] Patent Number: 4,766,175
[45] Date of Patent: Aug. 23, 1988

[54] BLEND COMPRISING EPDM GRAFT TERPOLYMER AND ACRYLATE RUBBER

[75] Inventor: David E. Henton, Midland, Mich.

[73] Assignee: The Dow Chemical Company, Midland, Mich.

[21] Appl. No.: 898,743

[22] Filed: Aug. 15, 1986

Related U.S. Application Data

[63] Continuation of Ser. No. 737,368, May 23, 1985, abandoned.

[51] Int. Cl.$^4$ .................. C08L 51/04; C08L 51/06; C08L 25/12
[52] U.S. Cl. ......................... 525/71; 525/70; 525/84; 525/85; 525/80
[58] Field of Search ........................................ 525/71

[56] References Cited

U.S. PATENT DOCUMENTS

| | | |
|---|---|---|
| 3,489,821 | 1/1970 | Witt et al. . |
| 3,489,822 | 1/1971 | Witt et al. . |
| 3,502,604 | 3/1970 | Nakatsuka et al. . |
| 3,576,910 | 4/1971 | Jastrzebski . |
| 3,642,950 | 2/1972 | O'Shea . |
| 3,644,577 | 2/1972 | Lee et al. .............................. 525/71 |
| 3,691,260 | 9/1972 | Mittmacht et al. . |
| 3,830,878 | 8/1974 | Kato et al. . |
| 3,944,631 | 3/1976 | Yu et al. . |
| 4,202,948 | 5/1980 | Peascoe . |
| 4,224,419 | 9/1980 | Swoboda et al. . |
| 4,341,883 | 7/1982 | Gift . |
| 4,397,987 | 8/1983 | Cornell . |
| 4,433,102 | 2/1984 | Brandstetler et al. . |

FOREIGN PATENT DOCUMENTS

| | | |
|---|---|---|
| 46340 | 2/1982 | European Pat. Off. . |
| 59-62658 | 10/1984 | Japan . |

*Primary Examiner*—Carman J. Seccuro

[57] ABSTRACT

Rubber reinforced thermoplastic resins are provided comprising EPDM graft terpolymer elastomers and acrylate graft elastomers.

22 Claims, No Drawings

BLEND COMPRISING EPDM GRAFT TERPOLYMER AND ACRYLATE RUBBER

CROSS-REFERENCE TO RELATED APPLICATION

This is a continuation of application Ser. No. 737,368 filed May 23, 1985, now abandoned.

BACKGROUND OF THE INVENTION

The present invention relates to rubber reinforced resins. More particularly, the present invention relates to rubber reinforced resins having improved weather resistance and physical characteristics. In one embodiment, the present invention relates to an improved rubber reinforced styrene acrylonitrile resin.

It is previously known in the art to prepare rubber modified resins wherein the rubber is a graft copolymer or terpolymer containing ethylene, propylene and optionally a copolymerizable diene monomer. Such rubbers are known as EPDM rubbers. In U.S. Pat. No. 3,489,821 a blend comprising an EPDM graft terpolymer and a resin is disclosed. At Col. 7, line 31, the reference teaches that the graft copolymer-resin blend may be mixed with other resins and/or rubbers.

In U.S. Pat. No. 3,576,910, there is disclosed an ABS polyblend comprising matrix and graft superstrates consisting at least principally of a monovinylidene aromatic hydrocarbon and an unsaturated nitrile, i.e. styrene acrylonitrile copolymer. Suitable rubbers for use in the polyblend include diene rubbers, acrylate rubbers, polyisoprene rubbers and mixtures thereof.

In U.S. Pat. No. 4,397,987 a similar polyblend comprising a nitrile rubber and an EPDM graft rubber is disclosed. In Table 9, Col. I, a blend of an ungrafted EPDM rubber and HYCAR 4041, an acrylate rubber, was prepared. However, the compati-bility of the rubber blend was so poor that the blend could not be cured.

Previously known rubber reinforced resins comprising an EPDM graft copolymer elastomer have demonstrated high impact and good weather resistance, particularly resistance to ozone and radiation degradation. These resins, however, have demonstrated poor ductility, as shown by generally low elongations of from about 10 to 20 percent as measured by ASTM test D-638 at 0.2 inches/minute. Frequently, such resins are characterized by a "cheesy" or friable nature when flexed or drawn. This poor ductility in the resulting rubber reinforced weatherable polymer is believed to be a result of a low level of crosslinking inherent in the EPDM graft copolymer rubber. Whereas good weather resistance results from the use of EPDM copolymer rubbers due to the inherent chemical stability of such rubber, the same stability results in only a poor or limited ability to crosslink the EPDM rubber or graft with matrix polymer. While to some extent this problem may be alleviated by the use of greater amounts of initiator in the grafting processes or high temperature post treatment, such variations involve increased cost and ultimate contamination of the resin resulting in decreased weatherability, poor appearance or decreased notched izod strength.

It would be desirable to provide an improved resin having high impact strength and weather resistance without loss of ductility. It would further be desirable to provide an improved styrene acrylonitrile resin achieving impact strength and weather resistance as well as good ductility without deleterious effects on the grafting or crosslinking in the EPDM rubber.

SUMMARY OF THE INVENTION

According to the present invention, there is now provided a rubber reinforced thermoplastic polyblend comprising an elastomer and a matrix polymer wherein the elastomer comprises both an EPDM terpolymer rubber and an acrylate rubber. Due to the weather resistant properties of both the EPDM and acrylate rubbers in the compatibilized blend of the invention a composition of matter having good weather resistance and an improved combination of gloss, toughness and ductility over previously known weather resistant rubber reinforced resins is provided.

DETAILED DESCRIPTION OF THE INVENTION

The elastomer phase desirably may comprise up to about 70 percent by weight of the polyblend of the invention. Preferred amounts are from about 2 percent to about 40 percent. Most preferred amounts are from 5 to about 35 percent by weight.

EPDM rubbers employed to prepare the grafted elastomers for use in the present invention are well known in the art. Their description and a means for the preparation thereof has been described in the previously cited U.S. Pat. Nos. 3,489,821 as well as 4,202,948, both of which teachings are incorporated herein by reference. While a variety of alpha-monoolefins may be used in preparing EPDM rubbers, principally such elastomers are a terpolymer of ethylene and propylene with an ethylenically unsaturated copolymerizable non-conjugated diene monomer. Illustrative non-limiting examples of suitable dienes which may be used include dicyclopentadiene, methylidene norbornene, ethylidene norbornene and 1,4-hexadiene.

Methods of preparing EPDM graft copolymers are also well known in the art. For example, an EPDM-/methyl methacrylate graft copolymer may be prepared by grafting methyl methacrylate to the EPDM backbone in the manner taught in U.S. Pat. Nos. 3,489,821; 3,489,822 and 3,642,950 all of which are incorporated herein by reference.

Acrylate rubbers for grafting and use according to the present invention are also previously known in the art and described, for example, in U.S. Pat. Nos. 3,830,878; 4,341,883; 3,944,631; 3,691,260 and 4,224,419, the teachings of which are incorporated herein by reference. Preferred acrylate rubbers are crosslinked homopolymers of $C_{1-8}$ alkyl acrylates, especially butyl acrylate or 2-ethylhexyl acrylate, and crosslinked copolymers thereof with up to about 25 weight percent, preferably up to about 10 percent, of a copolymerizable comonomer. Suitable copolymerizable comonomers include monovinylidene aromatic monomers, e.g. styrene, alpha-methyl styrene, etc. and alkyl methylacrylates such as methyl methacrylate. A preferred acrylate rubber comprises polybutyl acrylate optionally with crosslinkers such as various di-and tri-vinyl substituted crosslinking agents present in an amount up to about 5 percent by weight based on rubber total weight.

Preferably the crosslinked acrylate rubber is prepared by an emulsion process. Emulsion polymerized acrylate rubbers when employed may be partially agglomerated as is previously known in the art in order to provide greater variety of particle size distribution in the resulting acrylate rubber product thereby improving gloss and impact properties of the resin. The rubber particles can also be grown to various sizes by known seeding techniques and a mixture of previously prepared large and small particles employed to form the grafted rubber. The acrylate rubber volume average particle diameter are from about 500Å to about 10,000Å. The rubber has large particles of volume average particle diameter from about 3000Å to about 10,000Å and small particles of volume average diameter from about 500Å to about 2500Å.

In a preferred embodiment the acrylate rubber has a volume average particle diameter from about 500Å to about 2500Å. Volume average particle diameters are measured in the latex form of the rubber before grafting using techniques of Transmission Electron Microscopy or hydrodynamic chromatography as disclosed in U.S. Pat. No. 4,419,496.

Grafting of acrylate rubbers is also well known to the skilled artisan and disclosed, for example, in the above cited U.S. Pat. Nos. 3,830,878; 4,341,883; 3,944,631; 3,691,260 and 4,224,419. Preferably the crosslinked acrylate rubber is grafted by means of an emulsion process. The amount of grafting in both EPDM and acrylate rubbers may vary over wide ranges. As defined by percent grafting (attached rigid phase weight/rubber weight × 100) the percent graft may be from about 5 to about 150. Preferred percent grafting limits are from about 10 to 100. Desirable grafting levels are dependant on particle sizes. Large rubber particles generally may possess lesser amounts of grafted matrix or rigid phase. Graft forming monomers suitably employed in the grafting reactions include any polymerizable monomer capable of forming graft bonds to the previously described EPDM and acrylate rubber substrates. Mixtures of monomers, i.e. copolymerizable monomers may also be employed. While it is preferred that each rubber substrate be grafted with the same matrix graft polymer or copolymer, different grafting matrixes may be employed provided that the same are mutually compatible. Methyl methacrylate and styrene/acrylonitrile (SAN) are examples of mutually compatible grafting polymers.

By means of an appropriate selection of the amount of grafted EPDM rubber and the particle size, amount of crosslinking and total amount of acrylate rubber used in the final blend, resins having a wide variety of product properties may be prepared.

In addition to the previously described grafted acrylate and EPDM rubbers, the present invented composition may optionally comprise other saturated elastomeric components including but not limited to vinyl acetate rubbers, hydro-genated diene rubbers, e.g. hydrogenated polybutadiene or hydrogenated block copolymers of butadiene with monovinylidene aromatic monomers, co- or terpolymers of ethylene and other alpha-olefins, i.e. ethylene propylene rubbers, and chlorinated polyethylenes. Preferably the elastomer consists essentially of the EPDM rubber and acrylate rubber.

While the matrix may also consist solely of grafted and ungrafted matrix polymer prepared during the grafting process, additional compatible matrix polymer may be separately added. Separately added matrix may be the same or different from the above described grafted hard phase. Suitable examples of grafted and non-grafted matrix or hard phase polymers include polymers of an alkyl methacrylate and interpolymers thereof with one or more different copolymerizable ethylenically unsaturated polar comonomers; polymers of vinylchloride and interpolymers thereof with one or more different copolymerizable ethylenically unsaturated copolymerizable polar comonomers; and polymers of monovinylidene aromatic monomers and interpolymers thereof with one or more different ethylenically unsaturated, copolymerizable polar comonomers. Examples of suitable polar comonomers include alkyl acrylates, acrylonitrile, vinyl acetate, alkyl methacrylates, etc. Preferably the matrix polymer comprises styrene acrylonitrile copolymer or a homopolymer or interpolymer of methyl methacrylate. A most preferred matrix resin is styrene/acrylonitrile having a styrene/acrylonitrile weight ratio of from about 60:40 to 95:5.

The grafted EPDM and acrylate rubbers may be compounded together with or without additional matrix polymer by any suitable means. In a preferred embodiment, the two resins are merely combined and melted accompanied by vigorous mixing. Mixers, mills, extruders or other suitable devices may be employed to prepare the resulting blend. The ratio of EPDM rubber to acrylate rubber may vary from about 1:99 to about 99:1, preferred rubber ratios are from about 10:90 to about 90:10.

Additional additives to provide altered resin properties may of course be present in the resulting polyblend. Examples include pigments, fillers, processing aids, antioxidants, stabilizers, ultraviolet stabilizers, and so forth.

The blends of the present invention may be used in applications wherein ABS resins have been previously usefully employed. For example, the composition may be blended with additional resins such as, polycarbonates, polysulfones, nylons, polyphenylene ethers, etc.; used in coextruded laminates; molded into complex shapes; etc.

SPECIFIC EMBODIMENTS

Having described the invention, the following examples are provided as further illustrative of the present invention and are not to be construed as limiting. Where provided in the examples and claims, percentages are expressed as percentages by weight.

Preparation of Butylacrylate Rubber

A reactor is loaded with 1.50 grams of $Na_2S_2O_8$, 3.00 grams, $NaHCO_3$, 1.7 milliliters acetic acid, 3.0 grams sodium dodecylbenzene sulfonate soap, 54.4 grams of 32 percent active polystyrene seed latex (ca 300Å) and 1389 grams of water. The contents are purged of oxygen and heated to 65° C. while being agitated at 175 RPM. Over a 3 hour period, 1000 grams of n-butyl acrylate/trimethyl propanetriacrylate (99.0/1.0) is added. Simultaneously, over a 5 hour period (conadd period), 848 grams of an aqueous stream containing 1.43 percent of sodium dodecylbenzene sulfonate is added. One half hour after the monomer stream is added, a shot of 200 grams of n-butylacrylate/allylmethacrylate (96/4) is added, followed by 100 grams of $H_2O$. The latex is heated 2 hours at 65° C. after the aqueous stream is finished.

The conversion of monomers is greater than 98 percent and the final particle size is 1033Å. The percent gel is 87.5 and the swelling index equals 11.4 (measured in methyl ethyl ketone solvent).

Other butyl acrylate rubber resins are prepared by variations of the crosslinker level, seed size, conadd period and other common variables known in the art.

SAN Graft of Butylacrylate Rubber

Into a reactor is placed 1179 grams of butyl acrylate rubber latex prepared as previously described (400 grams rubber) and 100 grams of water. The latex is purged of oxygen and heated to 85° C. while being agitated. Over a 7 hour period 756 grams of a monomer mixture of styrene/acrylonitrile (75/25) containing 0.10 parts of n-octyl mercaptan is added. Simultaneously, 1022 grams of an aqueous stream containing 1.43 percent sodium dodecyl benzene sulfonate soap and 0.21 percent sodium peroxy disulfate is added over a 7 hour period. The latex is heated at 85° C. for 0.5 hours after the conadd is finished, steam stripped to remove residual monomers and stabilized with antioxidants. The conversion is 98 percent and the final dry resin contains 35.1 percent rubber. The resin has 16 percent graft (weight of attached rigid phase/ weight of rubber×100) and the non-attached SAN rigid phase has molecular weight, Mw, of 113,000.

EXAMPLES 1–9

Various blends are prepared containing styrene acrylonitrile resin and grafted rubber. In comparative Example 9 the rubber is EPDM, a terpolymer of ethylene, propylene and 5-ethylidene-2-norbornene which is grafted with SAN as taught in Example 1 of U.S. Pat. No. 4,202,948 and blended with SAN of Mw=180,000 and S/AN 70/30 to give a 23 percent rubber resin. The resins in comparative Examples 7 and 8 are prepared by blending the grafted EPDM rubber resin in Example 9 with varying amounts of a styrene acrylonitrile matrix having a S/AN of 72/28 and Mw=85,000. The resins of Examples 1–6 are illustrative of the present invention and additionally contain grafted acrylate rubber prepared as previously described. The resins are prepared by blending the resin in Example 9 with the acrylate graft copolymer and styrene/acrylonitrile matrix of Mw=85,000, S/AN 72/28 by compounding in a Welding Engineers twin screw extruder (0.8 inch diameter) and injection molding at 425°/450° F. on a 2-ounce Negri Bossi injection molding machine to provide molded circular chips, 2 inches diameter by ⅛ inch thickness and test bars (0.5 inches×0.125 inches×6.5 inches). The circular chips were tested for gloss and dart impact strength. The test bars were tested for tensile strength, elongation and izod impact. Melt flow rates (MFR) were determined according to ASTM D-1238 at 230° C., 3800 grams. Further information and results are contained in Table I.

TABLE I

| Ex. | EPDM % | Acrylate % | Total Rubber % | % E[1] | Ty[2] | Tr[3] | Izod[4] | MFR | Gloss[5] | Impact[6] |
|---|---|---|---|---|---|---|---|---|---|---|
| 1 | 9 | 9[7] | 18 | 26 | 6597 | 5376 | 1.4 | 4.1 | 91 | 320+ |
| 2 | 5 | 20[7] | 25 | 41 | 5685 | 4718 | 1.3 | 1.2 | 86 | 320+ |
| 3 | 4.5 | 25[7] | 30 | 67 | 4743 | 4313 | 1.9 | 1.7 | 87 | 320+ |
| 4 | 5 | 20[8] | 25 | 44 | 4956 | 4106 | 0.7 | 1.7 | — | 320+ |
| 5 | 9 | 9[9] | 18 | 45 | 5354 | 4544 | 2.4 | 3.7 | 85 | 320+ |
| 6 | 18 | 5[9] | 23 | 40 | 5548 | 4632 | 11.9 | 1.3 | 84 | 320+ |
| 7[10] | 11.5 | 0 | 11.5 | 10 | 7917 | 6584 | 0.9 | 7.9 | 88 | 220 |
| 8[10] | 18 | 0 | 18 | 14 | 6560 | 5288 | 4.9 | 3.2 | 82 | 320+ |
| 9[10] | 23 | 0 | 23 | 17 | 5448 | 4565 | 12.9 | 1.0 | 39 | 320+ |

[1] elongation ASTM D-638 at .2 inches/minutes
[2] tensile yield, ASTM D-638, at .2 inches/minutes (lbs/in.$^2$)
[3] tensile rupture, ASTM D-638, at .2 inches/Minutes (lbs./in.$^2$)
[4] impact, ASTM D-256 ft. lbs./inch of notch
[5] Gardner gloss measured at 60°, percent, ASTM D-523
[6] Gardner dart impact measured on 2 inch × .125 inch (50 mm × 3 mm) chips (inch - lbs.)
[7] 1033Å volume average particle size, grafted SAN 113,000 Mw, S/AN = 75/25, 16 percent graft
[8] 740Å volume average particle size, grafted SAN 113,000 Mw, S/AN = 90/10
[9] 1500Å volume average particle size, grafted SAN 107,000 Mw, S/AN = 75/25, 46 percent graft
[10] comparative By comparison of the properties of the resins of the present invention (Examples 1–6) with the properties of the resins of Examples 7–9, it is seen that improved ductility as measured by elongation and excellent gloss are obtained according to the present invention with relatively little degradation of other resin properties, especially toughness, as measured by Izod impact and dart impact.

EXAMPLES 10–13

The following examples illustrate the use of acrylate rubber resins of various particle sizes and of alternate graft and free matrix polymers. Formulations for the various resins are as follows:

EXAMPLE 10

33.3 Percent of a 75/25 S/AN grafted 1500Å monodisperse butylacrylate rubber resin, 43.5 percent of the EPDM resin of Example 9 and 23.2 percent of polymethyl methacylate available from Rohm & Haas Company under the trade designation V920.

EXAMPLE 11

39.1 Percent of the EPDM resin of Example 9, 20.3 percent of SAN grafted agglomerated butylacrylate rubber (a bimodal sized emulsion rubber), 40.6 percent of SAN (Mw=85,000, S/AN 72/28).

EXAMPLE 12

34.8 percent of the EPDM resin of Example 9, 25.0 percent methyl methacrylate grafted butylacrylate rubber (KM330, Rohm & Haas), 40.2 percent of SAN (Mw=85,000, S/AN 72/28).

EXAMPLE 13

43.4 Percent of the EPDM resin of Example 9, 16.7 percent of 1500Å butylacrylate rubber resin grafted with SAN, 13.3 percent of 5500Å butylacrylate rubber resin grafted with SAN and 26.6 percent SAN (Mw=85,000, S/AN 72/28).

These resins were compounded, molded and tested in the same way as the examples in Table I. Results are contained in Table II.

TABLE II

| Ex. | % EPDM Rubber | % Acrylate Rubber | Total Rubber | % E[1] | Ty[2] | Tr[3] | Izod[4] | Gloss[5] | MFR | Impact[6] |
|---|---|---|---|---|---|---|---|---|---|---|
| 10[7] | 10 | 15[8] | 25 | 59 | 4787 | 4498 | 5.0 | 80 | 2.9 | 320+ |
| 11 | 9 | 9[9] | 18 | 26 | 6282 | 5169 | 1.8 | 75 | 3.5 | 320+ |
| 12 | 8 | 20[10] | 28 | 21 | 5529 | 4417 | 2.0 | 84 | 2.6 | 320+ |
| 13 | 10 | 15[11] | 25 | 21 | 5769 | 4540 | 6.0 | 83 | 2.3 | 320+ |

[1] Elongation, ASTM D-638 at .2 inches/minute
[2] tensile yield, ASTM D-638 at .2 inches/minute (lbs./inch$^2$)
[3] tensile rupture, ASTM D-638, at .2 inches/minute (lbs./inch$^2$)
[4] impact, ASTM D-256 ft.lbs/inch of notch
[5] Gardner Gloss measured at 60°, ASTM D-523
[6] Gardner dart impact measured on 2 inch × .125 (50 mm × .3 mm) chips (inch - lbs.)
[7] Contains 23.2 percent polymethylmethacrylate V920 sold by Rohm & Haas
[8] 1500Å Volume average particle size, grafted SAN Mw = 231,000, S/AN 75/25, 24 percent graft
[9] Acrylate rubber was agglomerated from 1500Å to a mixture of 8000Å/1500Å before grafting with S/AN 75/25, Mw = 193,000, 33 percent graft
[10] Butyl acrylate rubber grafted with methyl methacrylate sold as KM 330 by Rohm & Haas
[11] Acrylate rubber is a 50/50 mixture of 5500Å/1500Å particles grafted separately with S/AN 75/25

Ductility as measured by flex resistance of injection molded bars is tested by repeated hand flexing of test bars (0.5 inch by 0.125 inch by 6.5 inch) of the previously described resins. In the test, the bar is intially bent through an angle of 180° upon itself, then immediately bent through an angle of 360° in the reverse direction upon itself. The process is repeated until the bar fractures or cracks. The hand flex life is the number of bends (including the intial 180° bend) required to cause failure. The average of 5 samples is shown in Table III.

TABLE III

| Example | Hand-Flex Life (5 Tests) |
|---|---|
| 9* | 3.1 |
| 8* | 2.3 |
| 7* | 0.4 |
| 1 | 4.5 |
| 2 | 6.0 |
| 3 | 4.4 |
| 4 | 5.6 |
| 5 | 4.4 |
| 6 | 5.6 |
| 10 | 6.4 |
| 11 | 4.4 |
| 12 | 6.8 |
| 13 | 7.4 |

*Not examples of the present invention

What is claimed is:

1. A rubber-reinforced thermoplastic polyblend comprising an elastomer and a compatible matrix polymer wherein the matrix polymer comprises styrene and acrylonitrile in polymerized form and the elastomer comprises both a styrene/acrylonitrile coplymer grafted EPDM terpolymer rubber and a styrene/acrylonitrile copolymer grafted crosslinked polymer consisting of a $C_{1-8}$ alkyl acrylate and at least one multivinyl monomer crosslinker.

2. A rubber reinforced thermoplastic polyblend according to claim 1 comprising up to about 70 percent elastomer.

3. A rubber reinforced thermoplastic polyblend according to claim 1 comprising from about 2 to about 40 percent elastomer.

4. A rubber reinforced thermoplastic polyblend according to claim 1 wherein the styrene acrylonitrile matrix polymer has a ratio of styrene/acrylonitrile of from about 60:40 to about 95:5.

5. A rubber reinforced thermoplastic polyblend according to claim 1 containing from about 5 to about 35 percent of an elastomer.

6. A rubber reinforced thermoplastic polyblend according to claim 1 wherein in the elastomer component the amount of grafted polymer is from about 5 percent to about 150 percent by weight, based on the weight of rubber.

7. A rubber reinforced thermoplastic polyblend according to claim 1 wherein the grafted EPDM terpolymer is a grafted terpolymer of ethylene, propylene and a diene selected from the group consisting of dicyclopentadiene, methylidene norbornene, ethylidene norbornene and 1,4-hexadiene.

8. A rubber reinforced thermoplastic polyblend according to claim 1 wherein the grafted acrylate rubber comprises a grafted polymer of butyl acrylate.

9. A rubber reinforced thermoplastic polyblend according to claim 1 wherein the grafted acrylate rubber comprises an emulsion polymerized polymer.

10. A rubber reinforced thermoplastic polyblend according to claim 9 wherein the grafted acrylate rubber volume average particle diameter is from about 500 Angstroms to about 10,000 Angstroms.

11. A rubber reinforced thermoplastic polyblend according to claim 10 wherein the grafted acrylate rubber volume average particle diameter is from about 500 to about 2500Å.

12. A rubber reinforced thermoplastic polyblend according to claim 10 wherein the grafted acrylate rubber has a bimodal distribution of particle diameter prepared by agglomeration of small particles or by mixture of separately prepared large and small particles.

13. A rubber reinforced thermoplastic polyblend according to claim 12 wherein the grafted acrylate rubber comprises large particles having a volume average diameter from about 3000 to about 10000Å and small particles having a volume average diameter from about 500 to about 2500Å.

14. A rubber reinforced thermoplastic polyblend according to claim 1 wherein the matrix comprises a blend of polymethyl methacrylate and styrene acrylonitrile copolymer.

15. A rubber reinforced thermoplastic polyblend according to claim 1 wherein the matrix polymer additionally comprises a homopolymer or interpolymer of methylmethacrylate.

16. A rubber reinforced thermoplastic polyblend according to claim 1 wherein the matrix additionally comprises a polymer or interpolymer of vinylchloride.

17. A rubber reinforced thermoplastic polyblend according to claim 1, wherein the acrylate rubber comprises a shell/core particle.

18. A rubber reinforced thermoplastic polyblend according to claim 1, wherein the weight ratio of grafted EPDM rubber to grafted acrylate rubber is from about 10:90 to about 90:10.

19. A rubber reinforced thermoplastic polyblend according to claim 8, wherein the acrylate rubber comprises a butyl acrylate homopolymer.

20. A rubber reinforced thermoplastic polyblend according to claim 1 wherein at least one of the graft polymers additionally comprises methyl methacrylate.

21. A rubber reinforced thermoplastic polyblend according to claim 1 wherein the matrix polymer additionally comprises methyl methacrylate.

22. A rubber reinforced thermoplastic polyblend according to claim 20 wherein the matrix polymer additionally comprises methyl methacrylate.

* * * * *

UNITED STATES PATENT AND TRADEMARK OFFICE
CERTIFICATE OF CORRECTION

PATENT NO. :   4,766,175
DATED      :   August 23, 1988
INVENTOR(S) :  David E. Henton It is certified that error appears in the above-identified patent and that said Letters Patent is hereby corrected as shown below:

First page, under References Cited, second patent listed,"3,489,822 1/1971 Witt et al. ." should read --3,489,822 1/1970 Witt et al. .--.

First page, second column, under the last cited reference, please add, --4,585,832 1986 Kokubo--.

Signed and Sealed this

Eleventh Day of April, 1989

*Attest:*

DONALD J. QUIGG

*Attesting Officer*      *Commissioner of Patents and Trademarks*